Patented Aug. 1, 1944.

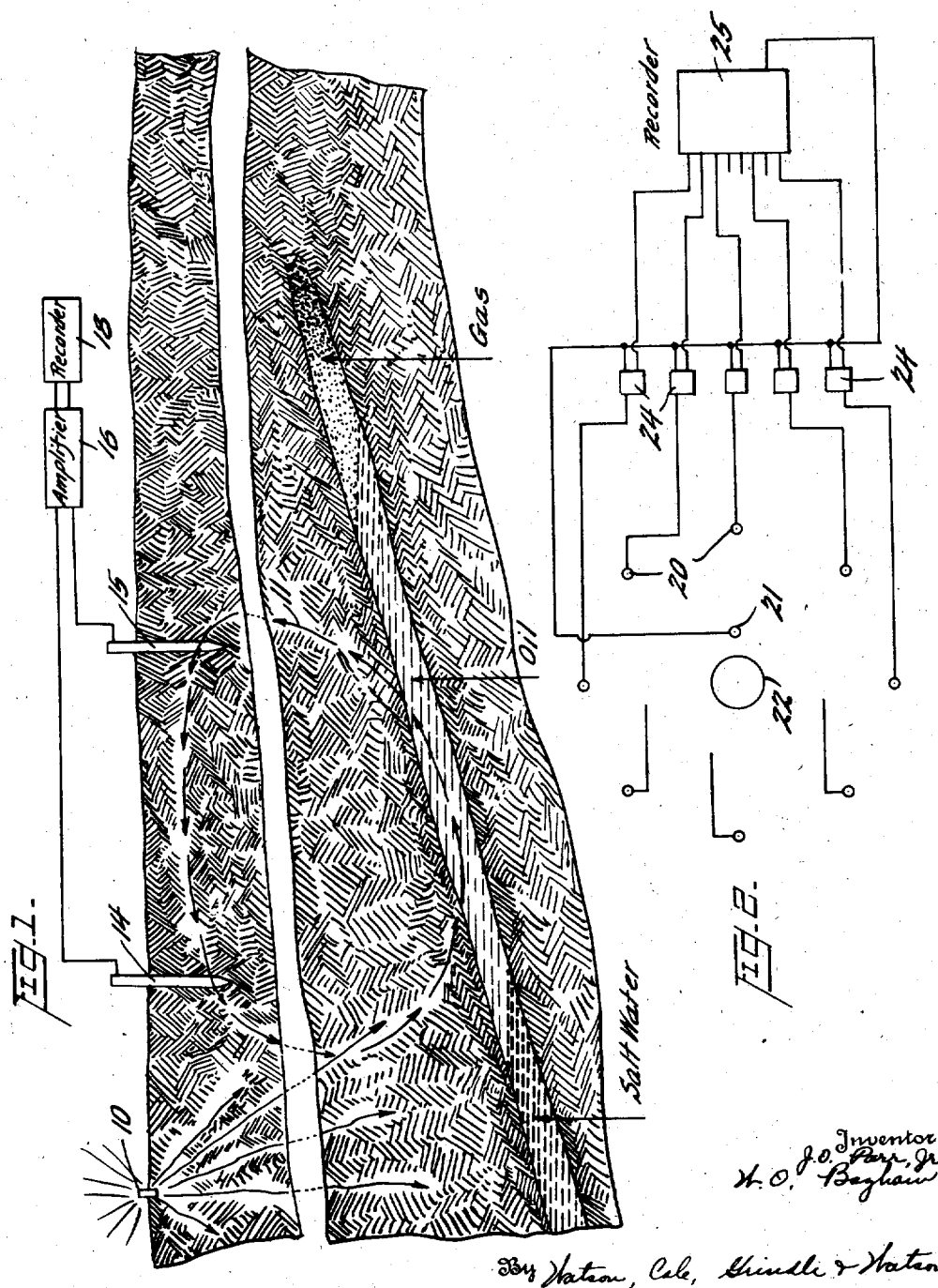

2,354,659

UNITED STATES PATENT OFFICE 2,354,659

SEISMIC SURVEYING

Willis Oliver Bazhaw and Josephus O. Parr, Jr., San Antonio, Tex., assignors to Olive S. Petty, San Antonio, Tex.

Application June 13, 1942, Serial No. 446,966

2 Claims. (Cl. 181—0.5)

This invention relates to geophysical exploration and has for its principal object the provision of a novel method of locating oil deposits.

Our improved method consists essentially in detonating an explosive charge to set up subsurface seismic impulses, and measuring the potentials at spaced points on or near the surface established by the resultant surge of fluids through porous subsurface zones.

Our invention is based on the recognized fact that electrofiltration potentials occur whenever an electrolyte is forced under pressure through a porous medium. Thus it can be shown that the electromotive force so produced is directly proportional to the differential pressure and the electrical resistivity of the electrolyte, and inversely proportional to the viscosity of the electrolyte, as represented by the formula $$\Delta E = \frac{mP\rho}{v}$$

where $v$=viscosity of electrolyte,
$\rho$=resistivity of electrolyte,
$\Delta E$=E. M. F.,
$m$=constant depending on porous medium, and
$P$=pressure.

Furthermore, when liquids of different ion concentrations, such as salt water and oil, are contacted through a porous medium, diffusion potentials of even greater value may be established. Thus the potentials so developed in the vicinity of oil bearing strata may reach substantial values and can be detected by surface electrodes suitably placed with respect to the shot point, and recorded with an ordinary reflection seismograph recorder, after passing through the necessary stages of amplification, to afford a direct indication of the location of the oil deposit. In this respect the instant method differs radically from prior methods of exploration, which do not purport to afford direct indication of the presence and location of oil.

For instance, it has heretofore been proposed to establish a flow of current through the ground between electrodes to which are applied substantial voltages from an external source, and to measure the variation in flow when seismic impulses are propagated. This method is essentially concerned with the recording of reflected waves, one of the principal objects being the suppression of direct longitudinal waves, and the principles applied in the use of this method are therefore closely analogous to those employed in ordinary seismic reflection work. Thus, such a method deals with the measurement of changes in the earth's resistance resulting from the propagation of seismic energy, the resistance changes occurring substantially at the frequency of the seismic waves. Any electrofiltration or diffusion potentials developed during the use of this method are of inconsequential value as compared with the voltages externally applied to the ground through the electrodes.

It has also been proposed to locate oil bearing formations by causing current flow through the ground from an external source and measuring the potential difference at spaced points on the surface, on the theory that oil is frequently found in areas exhibiting high salinity, the presence of the salt solution being evidenced by the low potential difference resulting from the increased conductivity of the soil in such areas. This method does not involve seismic propagation and is not concerned with voltages generated by seismic waves.

Use of electrofiltration voltages has been proposed for the logging of wells, the suggested method involving filling the well with water and mud to increase the hydrostatic pressure therein, and taking measurements of the voltages developed at different depths within the well. In the use of this method it is presumed that the seepage of fluid from the well will produce different voltages at different depths by reason of the increased rate of seepage at levels in which the formation is more porous.

The present method is especially applicable in locating stratigraphic traps such as a sand lens in a mass of shale, or permeable zones in sandstone surrounded by less permeable material. Thus it will be apparent that when there exists a porous formation in which are trapped gas, oil, and salt water in the order named, a seismic disturbance will force the fluids upward, the gas compressing readily, and the resultant diffusion of salt water into the oil bearing sand and the flow of oil and gas through the porous medium will cause current flow, whereas the potential developed in the absence of oil will be negligible or nil owing to the high conductivity of salt water and the absence of the diffusion effect. Measurement of the voltage resulting from this flow of oil and gas, which is substantially a D. C. voltage for an appreciable period of time, therefore affords a direct indication of the presence of oil in a subsurface formation which has been determined by other methods to be likely to contain oil. It will therefore be appreciated that the present method is a distinct departure from prior methods which do not locate specific deposits, but furnish only a physical indication requiring interpretation in geologic terms.

Our invention finds an important use when, due to some failure or inaccuracy in the application of previous methods, a well has been drilled at a point spaced slightly from the principal oil deposit. In such cases the proper direction for drilling may be determined by positioning a first electrode at the surface adjacent the well and locating a plurality of electrodes in a circle about the first electrode, and measuring the potential between each of the circularly arranged electrodes and the first electrode. When a charge of explosive is fired in the well at a depth corresponding to a porous layer which is thought to bear oil, the oil in such layer will be violently forced upwardly through the porous material and the direction of the oil from the well will be that of the electrode developing the greatest potential.

Various other uses, features and objects of the invention will be apparent from the following description taken in connection with the accompanying drawing, in which:

Figure 1 is a schematic representation of one mode of practicing the invention, showing a vertical section through an oil bearing formation and the essential elements of the equipment which may be employed in carrying out the method; and Figure 2 is a view in plan illustrating the application of the method to an improperly located well.

In order to facilitate an understanding of the invention, reference will be made to the several embodiments thereof illustrated in the accompanying drawing and specific language will be employed. It will nevertheless be understood that various further modifications of the methods and devices illustrated herein, such as would fall within the province of those skilled in the art to employ, are contemplated as part of the present invention.

Referring first to Figure 1, it will be noted that a formation commonly referred to as a stratigraphic trap is shown, comprising a relatively porous structure, such as a sand lens, confined above and below by dense strata, and terminating at its upper end in relatively impermeable material. This type of formation is difficult to analyze by ordinary seismic methods, but lends itself readily to the instant method. The porous structure is shown as permeated with salt water, oil and gas, as is often the case, upward movement of fluid being prevented by gradual decrease in porosity of the layer toward its upper end.

In accordance with the present method, seismic impulses are propagated by the detonation of a suitable explosive at a point indicated at 10. When the compression front of these waves reaches the porous layer, the incompressible liquids will be forced upwardly with resultant compression of the gas, and potentials will be developed as the result of the diffusion of salt water into the oil as well as by reason of the flow of the fluids, and particularly of the oil and gas, through the porous medium as hereinbefore explained. The direction of current flow resulting from these potentials is indicated generally at 11 and a potential difference will accordingly be established at the surface of the earth between the points 14 and 15, at each of which is located an electrode designed to afford adequate contact with the ground. These electrodes are connected to amplifying equipment 16, for instance a thermionic valve amplifier, sufficient to produce a current of an amplitude suitable for visual indication. Preferably the energy from the amplifier is fed to a recorder 18, for example of the string galvanometer type commonly used in seismic surveying.

It will be appreciated that by appropriate disposition of a larger number of electrodes, the potentials developed over a substantial area of the surface may be measured, and the development of a relatively high potential between any two given points will indicate the presence of oil and gas beneath the same.

Turning now to Figure 2, it will be observed that the electrodes 20 are arranged substantially in a circle about a central electrode 21, the latter being positioned adjacent a well 22. Such an arrangement may conveniently be employed when the well has been improperly located, as hereinbefore explained. Thus it is common practice in such circumstances to detonate a large charge of explosive within the well at a depth corresponding to a porous formation in which it is assumed that oil is located, in the hope that the breaking down of the structure will result in flow of oil into the well. In proceeding in accordance with the present invention, a much smaller charge of explosive may be used, and the direct compressive action of the explosive on the porous formation, forcing the fluids upwardly as hereinbefore explained, will result in the development at the surface of substantial potential differences. The greatest potential difference between the central electrode 21 and each of the outer electrodes 20 will, of course, be developed in the direction of that electrode 20 toward which the oil extends. For the purpose of measuring the potential differences, these may be fed into suitable amplifiers 24 and thence to a recorder 25 to provide a permanent record if desired. When the direction of the oil has been ascertained, appropriate corrective measures may be taken, for example by the relocation of the well if necessary.

Having thus described the invention, what is claimed as new and desired to be secured by Letters Patent is:

1. A method of geophysical exploration for use in the location of subterranean porous formations permeated by fluid, comprising the steps of propagating seismic waves beneath spaced points in the vicinity of the earth's surface, whereby the fluid is subjected to pressure and caused to flow within the porous formation, detecting the potential difference developed between such points by electric current flow resulting from such fluid flow and amplifying and recording the potential difference.

2. A method of determining the direction of an oil deposit from an improperly located well, which comprises the steps of detonating a charge of explosive within the well at a depth corresponding generally to a porous formation permeated by fluid, whereby pressure is applied to the fluid contained in the formation and the fluid is caused to flow therein, and measuring the potential difference developed at the surface, by electric current flow resulting from such fluid flow, between a point adjacent the well and points disposed in a plurality of different directions from the well.

WILLIS OLIVER BAZHAW.
JOSEPHUS O. PARR, Jr.